United States Patent [19]  [11] 4,345,316
Hirotani et al.  [45] Aug. 17, 1982

[54] SHIFT ARITHMETIC DEVICE

[75] Inventors: Tatsushi Hirotani, Kawasaki; Satoshi Nagata, Kodaira, both of Japan

[73] Assignee: Fujitsu Limited, Kawasaki, Japan

[21] Appl. No.: 52,948

[22] Filed: Jun. 27, 1979

[30] Foreign Application Priority Data

Jun. 29, 1978 [JP] Japan .................. 53-79158

[51] Int. Cl.³ .................. G06F 7/00; G11C 19/00
[52] U.S. Cl. .................. 364/900
[58] Field of Search ... 364/200 MS File, 900 MS File

[56] References Cited

U.S. PATENT DOCUMENTS 3,543,245 11/1970 Nutter .................. 364/200
4,005,391 1/1977 MacPherson .................. 364/200
4,079,459 3/1978 Grant,Jr. .................. 364/200
4,085,447 4/1978 Pertl et al. .................. 364/900
4,139,899 2/1979 Tulpule et al. .................. 364/900

Primary Examiner—Gareth D. Shaw
Assistant Examiner—David Y. Eng
Attorney, Agent, or Firm—Staas & Halsey

[57] ABSTRACT

A shift arithmetic device which has a circulating shifter for shifting N-bit information by a specified number of bits and a set circuit for setting logic "0" or "1" in the shifted N-bit information at the bit positions corresponding to the specified number of bits shifted. A memory having stored therein N-bit patterns whose arrangements of logic "0" and "1" sequentially change and a bit arithmetic unit for executing logical processing, for each bit, between N-bit pattern read from an address of the memory corresponding to the number of bits shifted and N-bit information shifted by the circulating shifter.

6 Claims, 18 Drawing Figures

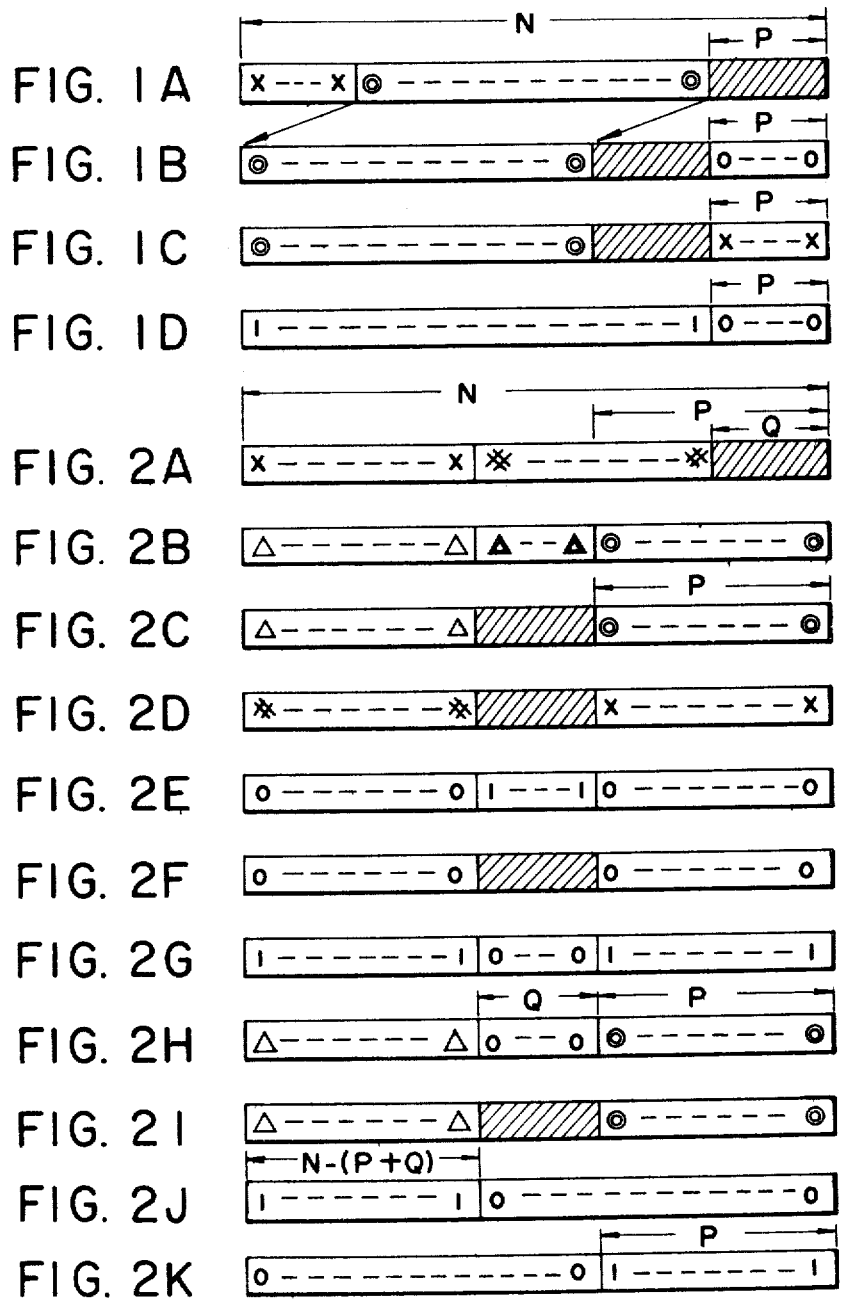

SHIFT ARITHMETIC DEVICE

BACKGROUND OF THE INVENTION

1. Field of the Invention

This invention relates to a shift arithmetic device in which N-bit information is shifted by a specified number of bits and logic "0" or "1" is set at specified bit positions.

2. Description of the Prior Art

A shift arithmetic device is employed for data processing using some bits of N-bit information of inserting bits of N-bit information in another N-bit information at some bit positions. Conventionally, such a shift arithmetic device comprises a circulating shifter comprising logic gate circuits and a set circuit part for setting logic "0" or "1" in N-bit information shifted by the circulating shifter. The set circuit part is provided with logic gate circuits for forming a set pattern having N bits of logic "0" and "1"; in the prior art, however, an increase in N of the N-bit information, that is, the number of bits used, introduces much complexity in the construction of the set circuit and requires a larger amount of hardware. Thus, the set circuit part becomes very expensive.

SUMMARY OF THE INVENTION

An object of this invention is to provide a simple-structured and economical shift arithmetic device.

Another object of this invention is to provide a shift arithmetic device in which set patterns of logic "0" and "1" are prestored in a memory and selectively read out. The set patterns correspond to an amount of information shift to perform a shift arithmetic operation by simple control.

Briefly stated, in the shift arithmetic device of this invention, there is provided a memory for storing N-bit set patterns for N-bit information to be subjected to a shift arithmetic operation, and the N-bit information is shifted by a circulating shifter by a specified amount. Next, logical processing is performed by a bit arithmetic unit, for each bit, between the shifted N-bit information and a set pattern read from the memory corresponding to the amount of shift.

BRIEF DESCRIPTION OF THE DRAWINGS

FIGS. 1A to 1D and 2A to 2K are diagrams illustrating a shift arithmetic operation;

DESCRIPTION OF THE PREFERRED EMBODIMENTS

In the case of obtaining the information of FIG. 1B by shifting the N-bit information of FIG. 1A to the left by P bits and setting the right of the hatched portion to logic "0" (a) a first step is to cyclically shift the N-bit information of FIG. 1A, by using a circulating shifter, to the left by P bits, as shown in FIG. 1C. Crosses and double circles indicate the positions of bits being shifted. Then, (b) a set pattern is prepared in which P bits are set to logic "0" at the righthand end portion, as shown in FIG. 1D, and after this, (c) an AND operation is performed between the information of FIG. 1C and that of FIG. 1D for each bit.

Further, for obtaining the N-bit information of FIG. 2C by inserting Q bits of the hatched portion of the N-bit information in the N-bit information of FIG. 2B at bit positions indicated by double triangles, (a) a first step is to cyclically shift N-bit information of FIG. 2A by a circulating shifter to the left by P bits so that Q bits, indicated by hatching, lie between bit positions of double crosses and bit positions of crosses, as depicted in FIG. 2D. (b) The next step is to prepare such a set pattern as shown in FIG. 2E, which has logic "1" at the bit positions corresponding to the Q bits of the hatched portion in the N-bit information of FIG. 2D and logic "0" at the other bit positions. Following this, (c) an AND operation is performed between the information of FIG. 2D and that of FIG. 2E for each bit, whereby the information shown in FIG. 2F is obtained. This information has logic "0" at the bit positions except at those of the hatched portion. Thereafter, (d) such a set pattern as shown in FIG. 2G is prepared. This pattern has logic "0" at the bit positions corresponding to the Q bits of the hatched portion in FIG. 2D and logic "1" at the other bit positions. Then, (e) an AND operation is performed between the information of FIG. 2B and that of FIG. 2G for each bit. Thus, the information shown in FIG. 2H, which has logic "0" at bit positions marked with the double triangles in FIG. 2B, is provided. Finally, an OR operation is performed between the information of FIG. 2F and that of FIG. 2H for each bit to obtain the N-bit information shown in FIG. 2I.

In the case of producing such set patterns as shown in FIGS. 1D, 2E and 2G by a logical gate circuit for the abovesaid shift arithmetic processing, the logical gate circuit is inevitably complicated in construction.

Figure 3:
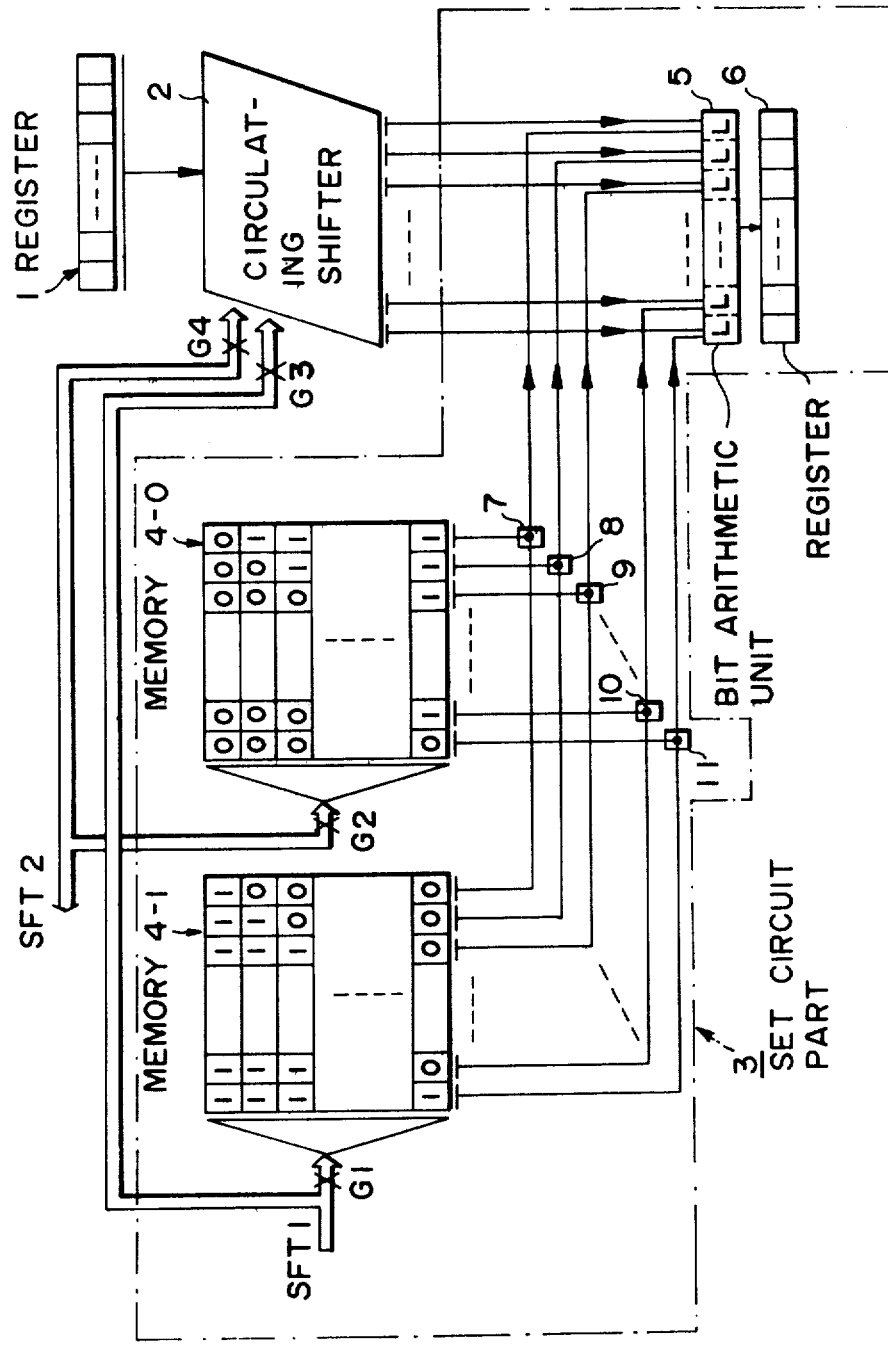
FIG. 3 is a block diagram illustrating the principal part of an embodiment of this invention.

To avoid this, in the present invention such set patterns are prestored in a memory and a desired one of them is read out thereof. FIG. 3 illustrates in block form the principal part of an embodiment of this invention. Reference numeral 1 indicates a register for setting therein the N-bit information to be subjected to shift arithmetic processing; 2 designates a circulating shifter comprising a logic gate circuit; 3 identifies a set circuit part for setting logic "0" or "1"; 4-0 and 4-1 denote memory having loaded therein set patterns; 5 represents a bit arithmetic unit which performs an arithmetic operation for each bit; 6 shows a register for setting therein the arithmetic operation results; and 7 to 11 refer to gate circuits for obtaining AND logic, OR logic and exclusive OR logic for each bit, the gate circuits being shown to be wired OR gates for the sake of brevity in the present embodiment. Reference characters G1 to G4 indicate gate circuits, and SFT1 and SFT2 designate shift signals each representative of the amount of shift.

Each of the memories 4-0 and 4-1 may be a RAM (Random Access Memory), ROM (Read Only Memory), PROM (Programmable Read Only Memory) or EPROM (Erasable Programmable Read Only Memory). The first memory 4-0 has stored therein, for example, a pattern having N bits which are all "0" and N set patterns in which the above pattern is sequentially shifted to the left bit by bit to load logic "1" at the shifted bit positions. The second memory 4-1 has stored therein set patterns corresponding to the inverse of the stored contents of the first memory 4-1. That is, the first memory 4-0 has loaded therein, at an address 0, a set pattern in which all the N bits are logic "0", at an address 1 a set pattern in which only the rightmost bit is logic "1" and the other remaining bits "0", at an address 2 a set pattern in which only the two rightmost bits are logic "1" and the other remaining bits "0", . . . , at an address N-1 a set pattern that only the leftmost bit is logic "0" and the other remaining bits "1". On the other hand, the second memory 4-1 has loaded therein, at an address 0, a set pattern in which the N bits all are logic "1", at an address 1 a set pattern in which only the rightmost bit is logic "0" and the other remaining bits "1", at an address 2 a set pattern in which only two rightmost bits are logic "0" and the other remaining bits "1", . . . , at an address N-1 a set pattern in which only the leftmost bit is logic "1" and the other remaining bits "0".

For obtaining the N-bit information of FIG. 1B from the N-bit information of FIG. 1A, the following processing is executed;

(a1) The information of FIG. 1A is set in the register 1 and thence applied to the circulating shifter 2.

(a2) The gate circuits G1 and G3 are turned ON to apply the shift signal SFT1 representing the amount of shift of P bits and direct the bit arithmetic unit 5 via a control line (not shown) to perform an AND operation.

(a3) The circulating shifter 2 responds to the shift signal SFT1 by shifting the information of FIG. 1A by P bits to output the information of FIG. 1C.

(a4) The shift signal SFT1 is applied via the gate circuit G1 to the second memory 4-1, in which it is decoded to obtain an address signal and from which a set pattern corresponding to the amount of shift, that is, the set pattern of FIG. 1D, is read using the address signal. At this time, the gate circuits G2 and G4 are closed, and the output from the first memory 4-0 is all "0".

(a5) The set pattern read from the second memory 4-1 is applied via the OR gates 7 to 11 to the bit arithmetic unit 5 together with the output from the circulating shifter; and the bit arithmetic unit 5 performs an AND operation, the results of which are set in the register 6. The content of the register 6 is such as shown in FIG. 1B.

In the case of setting logic "0" at the bit positions of the double triangles in the N-bit information shown in FIG. 2B, the following processing is executed:

(b1) The N-bit information of FIG. 2B is set in the register 1 and thence applied to the circulating shifter 2.

(b2) The gate circuits G1 and G2 are turned ON to supply the second memory 4-1 with the shift signal SFT1 indicating the amount of shift of N−(P+Q) bits, thereby to read a set pattern of FIG. 2J from the second memory 4-1. To the first memory 4-0 is applied the shift signal representing the amount of shift of P bits to thereby read a set pattern of FIG. 2K from the first memory 4-0. At this time, since the gate circuits G3 and G4 are closed, the information set in the register 1 is provided to the bit arithmetic unit 5 without being shifted by the circulating shifter 2.

(b3) The set patterns thus read from the first and second memories 4-0 and 4-1 are applied via the gates 7 to 11 to the bit arithmetic unit 5, in which the both set patterns are combined into a complete set pattern that P bits are logic "1", Q bits "0" and N−(P+Q) bits "1" from the right to left.

(b4) The bit arithmetic unit 5 performs an AND operation for each bit to output the information of FIG. 2H, which is set in the register 6.

When obtaining the information of FIG. 2F from that of FIG. 2A, a shift of P bits is executed by the circulating shifter 2, the set patterns of FIGS. 2J and 2K are read from the first and second memories 4-1 and 4-0 respectively, and in the bit arithmetic unit 5, the set patterns thus read out are inverted and then ANDed with the output from the circulating shifter 2.

Figure 4:
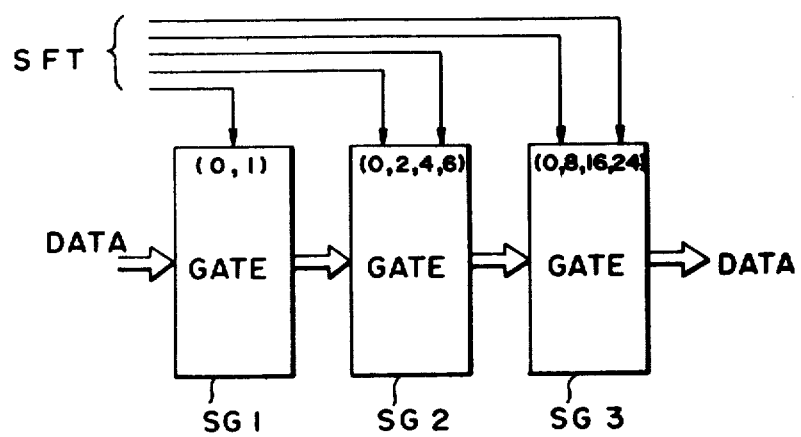
FIG. 4 is a block diagram showing an example of a circulating shifter for use in this invention.

FIG. 4 is a block diagram of the principal part of the circulating shifter 2, illustrating the case of performing a circular shift of 32-bit information. The shift signal SFT has a 5-bit configuration. A gate circuit SG1 executes a shift of 0 or 1 bit, a gate circuit SG2 a shift of 0, 2, 4 or 6 bits, and a gate circuit SG3 a shift of 0, 8, 16 or 24 bits. For example, in the case of performing a shift of 10 bits, the binary shift signal SFT is "01010", and signals "0", "01" and "01" are provided to the gate circuits SG1, SG2 and SG3 respectively, so that the amounts of shift in the gate circuits SG1, SG2 and SG3 are 0, 2 bits and 8 bits respectively; consequently, the 32-bit information is circularly shifted by 10 bits in all.

Figure 5:
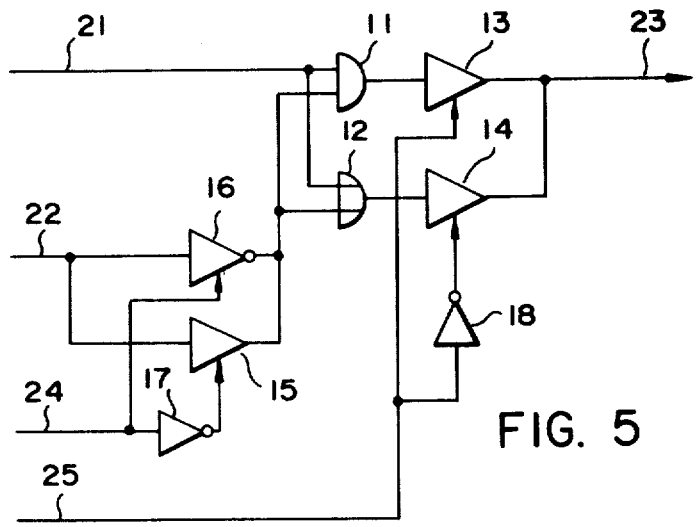
FIG. 5 is a block diagram showing a bit arithmetic unit for use in this invention.

FIG. 5 is a block diagram of the principal part of an example of the bit arithmetic unit, illustrating its construction for an arithmetic operation of one bit. In FIG. 5, reference numeral 11 indicates an AND gate; 12 designates an OR gate; 13 through 15 identify gates; 16 denotes a gate for producing an inverted output; 17 and 18 represent NAND gates; 21 shows the output bit signal of the circulating shifter; 22 refers to bit signals of the set patterns read from the first and second memories; 24 indicates a control signal for determining whether to invert the bit signals of the set patterns; and 25 designates a control signal for determining whether to output AND or OR logic.

When the control signal 24 is "0", the bit signal 22 of the set pattern is applied via the gate 15 to one input of each of the AND gate 11 and the OR gate 12; when the control signal 24 is "1", the set pattern signal 22 is inverted by the gate 16 and applied to one input of each of the AND gate 11 and the OR signal 12. When the control gate 25 is "0", the gate 14 is opened, and the OR output between the output bit signal 21 of the circulating shifter and the set pattern bit signal 22 is provided as the output bit signal 23; when the control signal 25 is "1", the gate 13 is opened, and the AND output between the output bit signal 21 of the circulating shifter and the set pattern bit signal 22 is provided as the output bit signal 23.

As has been described in the foregoing, in the present invention a set pattern is prestored in a memory, and N-bit information read from a circulating shifter and the set pattern read from the memory are subjected to logical processing by a bit arithmetic unit for each bit, and a desired set pattern is easily obtained; therefore, control of a shift arithmetic operation is simple. Further, since the memory can be formed with a ROM, PROM or the like, the device of the present invention is relatively inexpensive, simple in construction and small. Moreover, this invention has the advantage that a desired set pattern can easily be obtained by forming the memory with first and second memories and subjecting set patterns read from the first and second memories to logical processing for each bit and then applying the resulting logical output to a bit arithmetic unit.

It will be apparent that many modifications and variations may be effected without departing from the scope of the novel concepts of this invention.

What is claimed is:

1. A shift arithmetic device, having first and third input gates for applying a first shift signal and having second and fourth input gates for applying a second shift signal, comprising:
- a first register for storing N-bit information to be subjected to shift arithmetic processing, where N is an integer;
- circulating shifter means, operatively connected to said first register and to the third and fourth input gates, for shifting the contents of said first register in dependence upon the first and second shift signals;
- first memory means, operatively connected to the second input gate, for storing N-bit patterns, for receiving the second shift signal, and for reading out one of said N-set pattens in dependence upon the second shift signal;
- second memory means, operatively connected to the first input gate, for storing N-inverted set patterns, for receiving the first shift signal and for reading out one of said N-inverted set patterns in dependence upon the first shift signal, where said N-inverted set patterns are the inverse of said N-set patterns;
- a bit arithmetic unit, operatively connected to said first memory means, said second memory means and said circulating shifter means, for logically processing the output of said circulating shifter means, and said one of said N-set patterns and said one of said N-inverted set patterns respectively read from said first and second memory means; and
- a second register, operatively connected to said bit arithmetic unit, for storing the results of said logical processing.

2. A shift arithmetic device having a register for storing N-bit information, where N is an integer, a circulating shifter for receiving the N-bit information from the register, for receiving a shift signal indicating the amount by which the N-bit information is to be shifted and for executing a circular shift of the N-bit information, and a set circuit part for setting one of first and second logic bits in the N-bit information at the output of the circulating shifter at a bit position corresponding to the amount of shift of the N-bit information, wherein said set circuit part comprises:
- memory means for storing a plurality of N-bit patterns comprising first and second logic bits;
- means for reading one of the plurality of different N-bit patterns of first and second logic bits from said memory means, said one of the plurality of different N-bit patterns corresponding to the amount of shift of the N-bit information at the output of said circulating shifter; and
- means for logically processing the N-bit information at the output of said circulating shifter and the N-bit pattern read out from said memory means,
- said memory means comprising first and second memories for storing the plurality of N-bit patterns and a gate circuit for executing logical processing of N-bit set patterns read from said first and second memories to provide an output which is applied to the logical processing means.

3. A shift arithmetic device according to claim 2, wherein said first memory has loaded therein N-set patterns, wherein the first set pattern of said first memory comprises all logic "0's", wherein subsequent ones of the N-set patterns are formed by sequentially shifting the logic "0's" of the first set pattern by N,bit-by-bit, and by setting logic "1's" at the shifted bit positions, wherein said second memory has loaded therein N-set patterns, wherein the first set pattern of said first memory comprises all logic "1's", and wherein subsequent ones of the N-set patterns are formed by sequentially shifting the logic "1's" of the first set pattern by N,bit-by-bit, and by setting "0's" at the shifted bit positions.

4. A shift arithmetic device, having first and third input gates for applying a first shift signal and having second and fourth input gates for applying a second shift signal, comprising:
- a first register for storing N-bit information to be subjected to shift arithmetic processing, where N is an integer;
- circulating shifter means, operatively connected to said first register and to the third and fourth input gates, for shifting the contents of said first register in dependence upon the first and second shift signals, said circulating shifter means comprising:
  - a first shift gate, operatively connected to the third and fourth input gates, for executing a shift of one bit position in dependence upon the first and second shift signals;
  - a second shift gate, operatively connected to the third and fourth input gates and to said first shift gate, for executing a shift of two, four or six bit positions in dependence upon the first and second shift signals; and
  - a third shift gate, operatively connected to the third and fourth input gates and to said second shift gate, for executing a shift of eight, sixteen or twenty-four bit positions in dependence upon the first and second shift signals;
- first memory means, operatively connected to the second input gate, for storing N-set patterns, for receiving the second shift signal, and for reading out one of said N-set patterns in dependence upon the second shift signal;
- second memory means, operatively connected to the first input gate, for storing N-inverted set patterns, for receiving the first shift signal, and for reading out one of said N-inverted set patterns in dependence upon the first shift signal, where said N-inverted set patterns are the inverse of said N-set patterns;
- a bit arithmetic unit, operatively connected to said first memory means, said second memory means and said circulating shifter means, for logically processing the output of said circulating shifter means, and said one of said N-set and said one of said N-inverted set patterns respectively read from said first and second memory means; and
- a second register, operatively connected to said bit arithmetic unit, for storing the results of said logical processing.

5. A shift arithmetic device as set forth in claim 4, wherein said bit arithmetic unit is operatively connected to receive a control signal and an inverted control signal and wherein said bit arithmetic unit comprises:
- an inverted output gate, operatively connected to said first and second memory means, for receiving the bit signals of said N-set patterns and said N-inverted set patterns and for providing a first output signal;
- a first output gate, operatively connected to said first and second memory means, for receiving the bit signals of said N-set patterns and said N-inverted set patterns and for providing a second output signal;

a first AND gate, having a first input, operatively connected to said circulating shifter means, for receiving the output of said circulating shifter means, having a second input, operatively connected to said inverted output gate and said first output gate, for receiving said first and second output signals, and having an AND output;

an OR gate, having a first input, operatively connected to said circulating shifter means, for receiving the output of said circulating shifter means, having a second input, operatively connected to the output of said inverted output gate and the output of said first output gate, for receiving said first and second output signals, and having an OR output;

a first control gate, operatively connected to said AND gate, for providing said AND output in dependence upon said control signal; and a second control gate, operatively connected to said OR gate for providing said OR output in dependence upon said inverted control signal.

6. A shift arithmetic device, having first and third input gates for applying a first shift signal and having second and fourth input gates for applying a second shift signal, comprising:

a first register for storing N-bit information to be subjected to shift arithmetic processing, where N is an integer;

circulating shifter means, operatively connected to said first register and to the third and fourth input gates, for shifting the contents of said first register in dependence upon the first and second shift signals;

first memory means, operatively connected to the second input gate, for storing N-set patterns, for receiving the second shift signal, and for reading out one of said N-set patterns in dependence upon the second shift signal;

second memory means, operatively connected to the first input gate, for storing N-inverted set patterns, for receiving the first shift signal, and for reading out one of said N-inverted set patterns in dependence upon the first shift signal, where said N-inverted set patterns are the inverse of said N-set patterns;

a bit arithmetic unit, operatively connected to said first memory means, said second memory means and said circulating shifter means, for logically processing the output of said circulating shifter means, and said one of said N-set patterns and said one of said N-inverted set patterns respectively read from said first and second memory means, said bit arithmetic unit operatively connected to receive a control signal and an inverted control signal, said bit arithmetic unit comprising:

an inverted output gate, operatively connected to said first and second memory means, for receiving the bit signals of said N-set patterns and said N-inverted set patterns and for providing a first output signal;

a first output gate, operatively connected to said first and second memory means, for receiving the bit signals of said N-set patterns and said N-inverted set patterns and for providing a second output signal;

a first AND gate, having a first input, operatively connected to said circulating shifter means, for receiving the output of said circulating shifter means, having a second input, operatively connected to said inverted output gate and said first output gate, for receiving said first and second output signals, and having an AND output;

an OR gate, having a first input, operatively connected to said circulating shifter means, for receiving the output of said circulating shifter means, having a second input, operatively connected to the output of said inverted output gate and the output of said first output gate, for receiving said first and second output signals, and having an OR output;

a first control gate, operatively connected to said AND gate, for providing said AND output in dependence upon said control signal; and a second control gate, operatively connected to said OR gate, for providing said OR output in dependence upon said inverted control signal; and a second register, operatively connected to said bit arithmetic unit, for storing the results of said logical processing.

* * * * *

UNITED STATES PATENT AND TRADEMARK OFFICE
CERTIFICATE OF CORRECTION

PATENT NO. : 4,345,316
DATED : AUGUST 17 1982
INVENTOR(S) : TATSUSHI HIROTANI ET AL.

It is certified that error appears in the above—identified patent and that said Letters Patent is hereby corrected as shown below:

```
Column 1, line 12, "of" second occurrence should be --or--.
Column 2, line 34, "abovesaid" should be --above-said--.
Column 3, line 4, "that" should be --in which--;
          line 61, "complete" should be --composite--.
Column 4, line 37, "signal" should be --gate--;
          line 38, "gate" should be --signal--.
Column 5, line 12, "bit" should be --set--.
Column 8, line 38, delete "and".
```

Signed and Sealed this

Seventh Day of February 1984

[SEAL]

Attest:

GERALD J. MOSSINGHOFF

Attesting Officer    Commissioner of Patents and Trademarks